United States Patent
Busby

[19]

[11] Patent Number: 6,036,213

[45] Date of Patent: Mar. 14, 2000

[54] BICYCLE WITH SHOCK ABSORBING REAR ASSEMBLY AND COMMON CHAIN STAY/SHOCK ABSORBER MOUNTING BRACKET

[75] Inventor: James S. Busby, Costa Mesa, Calif.

[73] Assignee: GT Bicycles, Inc., Santa Ana, Calif.

[21] Appl. No.: 08/982,206

[22] Filed: Dec. 1, 1997

[51] Int. Cl.$^7$ .................................................. B62K 25/28
[52] U.S. Cl. ........................................................ 280/284
[58] Field of Search ................................. 280/275, 283, 280/284, 285, 286, 288

[56] References Cited

U.S. PATENT DOCUMENTS

| D. 372,002 | 7/1996 | Busby et al. | D12/111 |
|---|---|---|---|
| 944,795 | 12/1909 | Leet et al. | 280/284 |
| 1,047,430 | 12/1912 | Michaelson | 280/284 |
| 3,833,242 | 9/1974 | Thompson, Jr. | 280/281 |
| 3,974,892 | 8/1976 | Bolger | 180/227 |
| 4,828,781 | 5/1989 | Duplessis et al. | 264/250 |
| 4,850,607 | 7/1989 | Trimble | 280/281.1 |
| 4,889,355 | 12/1989 | Trimble | 280/281.1 |
| 4,902,458 | 2/1990 | Trimble | 264/46.6 |
| 4,986,949 | 1/1991 | Trimble | 264/258 |
| 5,158,733 | 10/1992 | Trimble | 264/258 |
| 5,215,322 | 6/1993 | Enders | 280/231 |
| 5,269,551 | 12/1993 | Martin et al. | 280/231 |
| 5,273,303 | 12/1993 | Hornzee-Jones | 280/283.3 |
| 5,306,036 | 4/1994 | Busby | 280/284 |
| 5,354,085 | 10/1994 | Gally | 280/285 |
| 5,368,804 | 11/1994 | Hwang et al. | 264/258 |
| 5,456,481 | 10/1995 | Allsop et al. | 280/281.1 |
| 5,464,248 | 11/1995 | Robinson et al. | 280/281.1 |

FOREIGN PATENT DOCUMENTS

| 155582 | 3/1954 | Australia . | |
|---|---|---|---|
| 356881 | 10/1905 | France . | |
| 923235 | of 1947 | France . | |
| 2395879 | 3/1979 | France . | |
| 3033294 | 4/1981 | Germany | 280/285 |
| 421518 | of 1947 | Italy . | |
| 423515 | of 1947 | Italy . | |
| 428442 | 12/1947 | Italy | 280/285 |
| 540821 | 3/1956 | Italy | 280/285 |
| 5105168 | 4/1995 | Japan . | |
| 434883 | 4/1965 | Switzerland . | |
| 24918 | of 0000 | United Kingdom | 280/284 |
| 17336 | 7/1913 | United Kingdom | 208/44 |
| 15332 | 1/1915 | United Kingdom | 208/93 |
| 220760 | 8/1924 | United Kingdom . | |
| 2084456 | 9/1990 | United Kingdom . | |
| PCT/GB92/0039 | 9/1992 | WIPO . | |
| PCT/US93/00502 | 7/1993 | WIPO . | |

OTHER PUBLICATIONS

1992 Cannondale Spec–Suspension Mountain Bicycles–Article–10 pp.

Guide to Suspension & High Performance;(Get With It) "Suspension"; vol. 3, 1992; pp. 9, 13, 14, 30, 31, 36–45, 47, 53, 60, 69–, 85, 86, 92, 96, 98, 100, 108–112, 117 & 119.

"Schiwnn Buell", Guide To Suspension, vol. 3, 1992, 4 pages.

Suspension Mania Strikes Cycling —Mountain Bike Action/Feb. 1992, 3 pgs.

(List continued on next page.)

*Primary Examiner*—Kevin Hurley
*Attorney, Agent, or Firm*—Stetina Brunda Garred & Brucker

[57] ABSTRACT

A bicycle comprising a main frame having a shock absorbing rear assembly pivotally connected thereto. The rear assembly comprises a pair of chain stays, and a pair of drop-outs which are attached to respective ones of the chain stays. The rear assembly further comprises a pair of swingarms which are attached to respective ones of the drop-outs, and a shock mount pivotally connected to and extending between the swingarms and the main frame. Pivotally connected to and extending between the shock mount and the main frame is a shock absorber of the rear assembly.

5 Claims, 1 Drawing Sheet

OTHER PUBLICATIONS

Boulder Intrepid AL —2pgs. —Mountain Bike Action/ Mar. 1992.
Fischer RS–1 Article–4 pgs. —Mountain Bike Action/Mar. 1992.
"Litespeed Suspension", Mountain Bike Action–May 1992, 1 page.
Schwinn S.A.S.S. 7 pgs. —Mountain Bike Action–May 1992.
Bicyling, May, 1992, pp. 26, 27, 58, 63, 64, and 105.
Welcome to the Next Generation . . . 9 pgs. —Mountain Bike Action –Jun. 1992.
Team Shockblok—6 pgs. —Mountain Bike Action–Jul. 1992.
Beating Around the Bush; Mountain Bike Action Oct. 1992 –21 pgs.
Mountain Biking, Nov. 1992, vol. 6, No. 11 –22 pgs.
Mountain Bike Action, Dec. 1992 14 pgs.
Mountain Bike Action, "San Andreas Report Card—Peccadillios, Peculiarities & Traits", Dec. 1992, pp. 80–81.
Mountain Bike Action, "AMP Mongoose", Jul. 1992 pgs. 5 pgs.
Mountain Bike Action, "Buyer's Guide", May 1992 pgs. 108 & 110.
Mountain Biking; "Pass Press 93"; Jan. 1993 vol. 7, No. 1; 10 p.
Mountain Biking, "Yeti–Lawwill DH: The Bike That Mert Built", vol. 10, No. 9, Sep. 1996, pgs. 64–70.
Mountain Bike, "Yeti–Downhill Bike", Sept. 1996, vol. 12, No. 8, pgs. 71–75.
Mountain & City Biking, "Slingshot", 6 pgs.
Offroad Pro–Flex 550 —3 pgs. —Offroad.
Trek 9000 Series Spec="This Beauty Is A Beast"—Article—8 pgs.

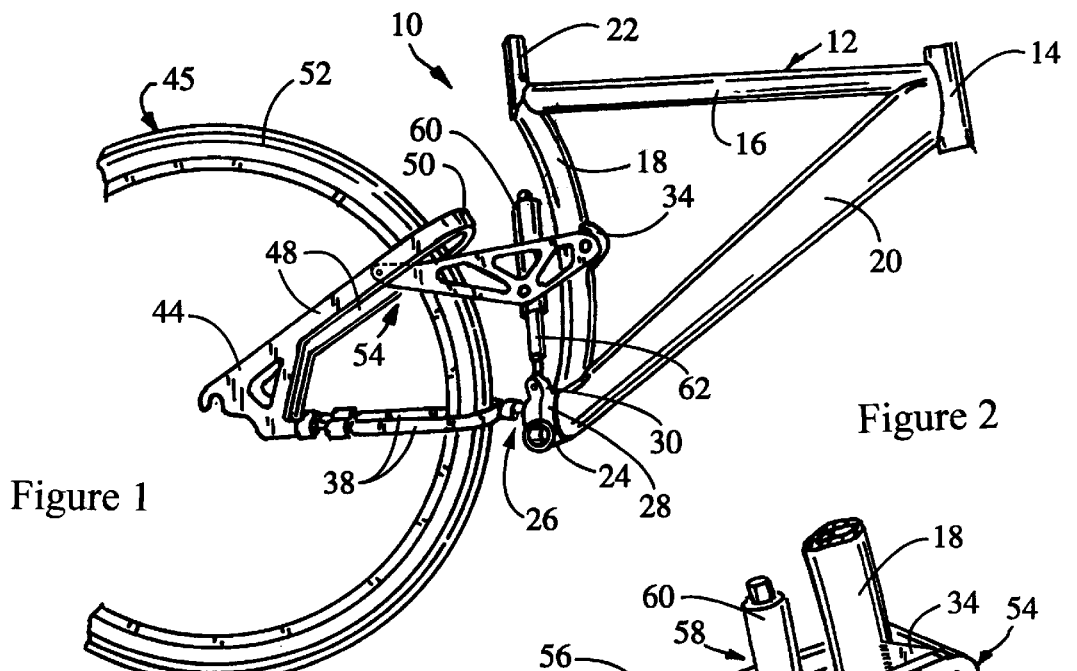
Figure 1
Figure 2
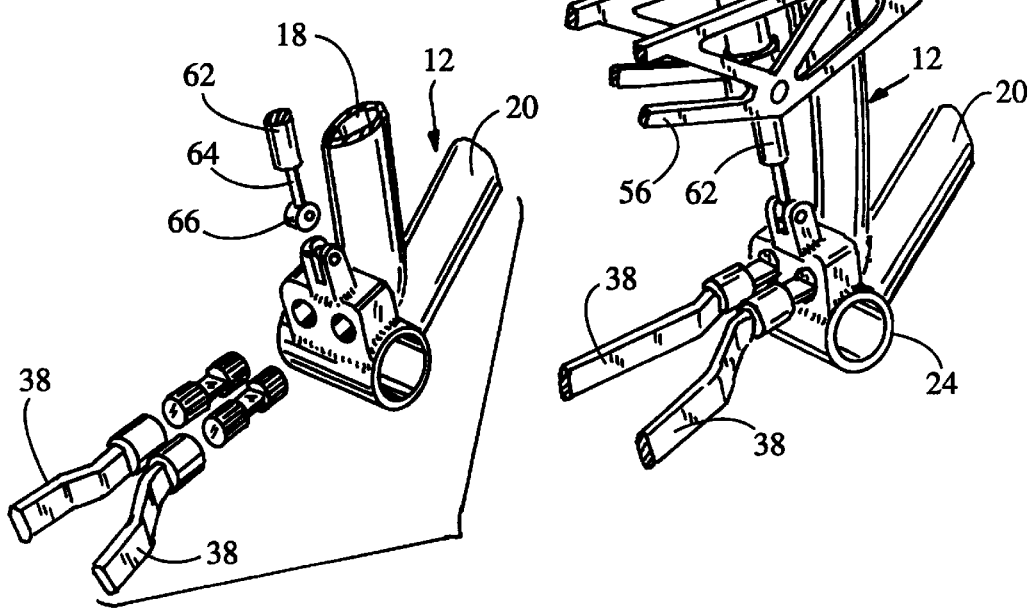
Figure 3

BICYCLE WITH SHOCK ABSORBING REAR ASSEMBLY AND COMMON CHAIN STAY/SHOCK ABSORBER MOUNTING BRACKET

FIELD OF THE INVENTION

The present invention relates generally to bicycles, and more particularly to a bicycle including a shock absorbing rear assembly and a common mounting bracket for the chain stays and shock absorber of the rear assembly.

BACKGROUND OF THE INVENTION

There is currently known in the prior art a wide variety of bicycles which include shock absorbing rear assemblies. Such bicycles typically include a main frame which comprises an elongate top tube rigidly secured to and extending between a head tube and an elongate seat tube. The head tube provides a structural base for the stem of the bicycle which has the handlebars attached thereto. The seat tube itself provides a base for a seat post which is generally telescopically received thereinto and to which is secured the saddle or seat of the bicycle. In the main frame, the seat tube includes a generally cylindrical bottom bracket shell attached to the bottom end thereof. The bottom bracket shell accommodates the crank assembly of the bicycle. The crank assembly itself comprises a bottom bracket spindle which includes a pair of cranks and a chain wheel attached thereto. Rigidly secured to and extending between the head tube and the bottom bracket shell is an elongate down tube of the main frame.

The shock absorbing rear assemblies of the prior art bicycles take on a wide variety of different configurations. In one commonly used configuration, the rear assembly comprises a pair of chain stays, the front ends of which are pivotally connected to the main frame. The back ends of the chain stays are attached to respective ones of a pair of drop-outs which accommodate the axle of the rear wheel. Also attached to respective ones of the drop-outs are the bottom ends of a pair of seat stays or swingarms, the top ends of which are attached to one end of a shock absorber. The end of the shock absorber opposite that attached to the swingarms is itself attached to a portion of the main frame. Typically, the shock absorber is disposed within the interior of the main frame (i.e., within the triangle defined by the top, seat and down tubes), with the end thereof opposite that attached to the swingarms being attached to the top tube. When the rear wheel encounters a bump or other obstruction, the resultant upward travel of the rear wheel axle is effectively dampened by the compression of the shock absorber.

As previously indicated, the above-described rear assembly is exemplary only, in that many variations of shock absorbing rear assemblies exist in the prior art. The common characteristics of all shock absorbing rear assemblies is that they include the rear wheel rotatably connected thereto and are movable independently of the main frame for purposes of facilitating the actuation of the shock absorber and the dampening of the upward movement of the rear wheel.

Those prior art bicycles including shock absorbing rear assemblies possess certain deficiencies which detract from their overall utility. Foremost of these deficiencies is the placement of the shock absorber of the rear assembly relative to the main frame of the bicycle. In this respect, in most prior art bicycles including shock absorbing rear assemblies, the shock absorber has an elevated position relative to the main frame and extends either completely or partially within the front triangle defined thereby. The elevated position of the shock absorber raises the center of gravity of the bicycle, thus diminishing its handling and performance characteristics. Additionally, the complete or partial placement of the shock absorber within the interior of the main frame increases the complexity and hence the cost associated with the manufacture and assembly of the bicycle.

The present invention addresses and overcomes these deficiencies by providing a bicycle including a shock absorbing rear assembly, the shock absorber of which is removed from within the interior of the main frame and does not load the seat tube or down tube thereof. The construction of the present bicycle significantly lowers the center of gravity thereof by lowering the position of the shock absorber relative to the main frame. This lower center of gravity substantially enhances the handling and performance characteristics of the present bicycle, and further provides various efficiencies in the assembly thereof, thus reducing the associated manufacturing costs.

SUMMARY OF THE INVENTION

In accordance with the present invention, there is provided an improved rear suspension bicycle which comprises a main frame including an elongate, arcuately contoured seat tube and an elongate down tube. Rigidly attached to the bottom ends of the seat tube and the down tube is a tubular, cylindrically configured bottom bracket shell of the main frame. The main frame further comprises a mounting bracket which is rigidly attached to the bottom bracket shell, and a mounting lug which is rigidly attached to the front side of the seat tube. The mounting bracket itself preferably comprises an adaptor portion which is rigidly attached to and extends upwardly from the bottom bracket shell, and an ear portion which is rigidly attached to and extends rearwardly and upwardly from the adaptor portion. The seat and down tubes, along with a top tube of the main frame, collectively define a front triangle of the bicycle.

The present bicycle further comprises a shock absorbing rear assembly which is pivotally connected to the main frame. The rear assembly itself comprises a pair of chain stays, the front ends of which are pivotally connected to the mounting bracket of the main frame, and in particular the adaptor portion thereof. The rear assembly further comprises a pair of drop-outs which accommodate the axle of the rear wheel and are pivotally connected to respective ones of the back ends of the chain stays, and a pair of seat stays or swingarms, the bottom ends of which are rigidly attached to respective ones of the drop-outs. Pivotally connected to the swingarms is the back end of a truss-like shock mount of the rear assembly, the front end of which is pivotally connected to the mounting lug of the main frame. In addition to the chain stays, drop-outs, swingarms and shock mount, the rear assembly of the present bicycle includes a shock absorber having an elongate, generally cylindrical body which is pivotally connected to the shock mount approximately intermediate the front and back ends thereof. Extending axially from the body downwardly toward the mounting bracket is an elongate piston rod of the shock absorber, the distal end of which is pivotally connected to the mounting bracket of the main frame, and in particular the ear portion thereof.

The shock absorber incorporated into the rear assembly of the present bicycle comprises a "pull shock". In this respect, when the rear wheel of the bicycle encounters a bump or other obstruction, the rear assembly is pivoted upwardly relative to the main frame. This movement of the rear assembly results in the upward pivotal movement of the chain stays about the pivot point defined between the front ends thereof and the mounting bracket attached to the bottom bracket shell, as well as the upward pivotal movement of the shock mount about the pivot point defined between the front end thereof and the mounting lug attached to the seat tube of the main frame. Due to the pivotal mounting of the shock absorber body to the shock mount, the upward pivotal movement of the shock mount causes the body of the shock absorber to be pulled upwardly relative to the piston rod which, as previously explained, has its distal end pivotally connected to the mounting bracket. The upward movement of the shock absorber body relative to the piston rod thereof effectively dampens the shock force applied to the rear wheel of the bicycle.

Due to the above-described construction of the present bicycle, the shock absorber of the rear assembly does not load the seat or down tube of the main frame, and is additionally removed from within the interior of the front triangle defined thereby. By lowering the position of the shock absorber relative to the main frame, this construction significantly lowers the center of gravity of the bicycle which substantially enhances the handling and performance characteristics thereof. Additionally, the construction of the present bicycle, and in particular the extension of the shock absorber behind the seat tube of the main frame (i.e., the removal of the shock absorber from within the interior of the main frame) provides various efficiencies in the assembly of the bicycle, thereby reducing the associated manufacturing costs. Such efficiencies include a reduction in the complexity of the bicycle design attributable to the common shock absorber/chain stay mounting bracket of the main frame.

BRIEF DESCRIPTION OF THE DRAWINGS

These, as well as other features of the present invention, will become more apparent upon reference to the drawings wherein:

FIG. 1 is a partial side-elevational view of the bicycle constructed in accordance with the present invention, illustrating the main frame and shock absorbing rear assembly thereof;

FIG. 2 is a partial perspective view of the main frame and shock absorbing rear assembly of the present bicycle; and FIG. 3 is an exploded view illustrating the manner in which the shock absorber and chain stays of the shock absorbing rear assembly of the present bicycle are attached to the main frame thereof.

DETAILED DESCRIPTION OF THE PREFERRED EMBODIMENT

Referring now to the drawings wherein the showings are for purposes of illustrating a preferred embodiment of the present invention only, and not for purposes of limiting the same, FIG. 1 partially depicts a bicycle 10 constructed in accordance with the present invention. The bicycle 10 comprises a main frame 12 which defines a front triangle of the bicycle 10 and includes a head tube 14, an elongate top tube 16, an elongate seat tube 18, and an elongate down tube 20. The front end of the top tube 16 and the top end of the down tube 20 are rigidly attached to the head tube 14 which accommodates the stem of the bicycle handlebars. In the main frame 12, the seat tube 18 has an arcuately contoured or bowed configuration, and extends between the back end of the top tube 16 and the bottom end of the down tube 20. Rigidly attached to the back end of the top tube 16 and the top end of the seat tube 18 is a tubular sleeve 22 which is adapted to telescopically receive the seat post of the bicycle 10. Attached to the top end of the seat post is a seat or saddle of the bicycle 10.

Referring now to FIGS. 1–3, the main frame 12 of the bicycle 10 further comprises a tubular, generally cylindrical bottom bracket shell 24 which is rigidly attached to the bottom end of the down tube 20. The bottom bracket shell 24 accommodates the crank assembly of the bicycle 10 which comprises a rotatable bottom bracket spindle having a pair of elongate cranks and a chain wheel attached thereto.

In addition to the above-described components, the main frame 12 of the bicycle 10 includes a mounting bracket 26 comprising an adaptor portion 28 which is rigidly attached to the top of the bottom bracket shell 24 and extends upwardly therefrom. In addition to being rigidly attached to the bottom bracket shell 24, the adaptor portion 28 of the mounting bracket 26 is rigidly attached to the bottom end of the down tube 20. The mounting bracket 26 further comprises an ear portion 30 which is rigidly attached to the top of the adaptor portion 28 and extends rearwardly and upwardly therefrom. The ear portion 30 itself defines a juxtaposed pair of ear segments 32 which are separated by a relatively narrow gap. Also included in the main frame 12 of the bicycle 10 is a mounting lug 34 which is rigidly attached to the front side of the seat tube 18. The uses of the mounting bracket 26 and mounting lug 34 will be described in more detail below.

In addition to the main frame 12, the bicycle 10 of the present invention comprises a shock absorbing rear assembly 36 which is pivotally connected to the main frame 12. The rear assembly 36 comprises a pair of elongate chain stays 38, the front ends of which are pivotally connected to the adaptor portion 28 of the mounting bracket 26. In the bicycle 10, such pivotal connection is facilitated by a front pair of flexible joints 40 which extend between respective ones of the front ends of the chain stays 38 and the adaptor portion 28. Those ends of the flexible joints 40 opposite those inserted into the front ends of the chain stays 38 are received into respective ones of a pair of complementary bores 42 disposed within the back side of the adaptor portion 28.

The rear assembly 36 of the bicycle 10 further comprises a pair of drop-outs 44 which are pivotally connected to respective ones of the back ends of the chain stays 38 and accommodate the axle of the rear wheel 45 of the bicycle 10. Such pivotal connection is preferably facilitated by a back pair of flexible joints 46 which are identically configured to the flexible joints 40 of the front pair. In this respect, one end of each of the flexible joints 46 is inserted into the back end of a respective chain stay 38, with the opposite end thereof being inserted into the corresponding drop-out 44. The preferred construction of the front and back pairs of flexible joints 40, 46 is fully disclosed in Applicant's co-pending U.S. application Ser. No. 08/866,039 entitled BICYCLE FLEXIBLE JOINT filed May 30, 1997, the disclosure of which is incorporated herein by reference. As will be recognized, the rear wheel 45 of the bicycle 10 is rotatably connected to the rear assembly 36 by virtue of the receipt of the axle thereof into the drop-outs 44.

The rear assembly 36 also includes a pair of elongate seat stays or swingarms 48, the bottom ends of which are rigidly attached to respective ones of the drop-outs 44. As seen in FIG. 1, the top ends of the swingarms 48 are connected to each other via a generally U-shaped connector member 50 which extends about the tire 52 of the rear wheel 45. The opposed ends of the connector member 50 are rigidly attached to respective ones of the top ends of the swingarms 48, with the connector member 50 being configured such that the arcuate end thereof is spaced from the tire 52 of the rear wheel 45 by a relatively wide gap.

Pivotally connected to the connector member 50 in relative close proximity to the top ends of the swingarms 48 is the back end of an elongate shock mount 54 of the rear assembly 36. As seen in FIGS. 1 and 2, the shock mount 54 has a truss-like configuration, with the front end thereof being pivotally connected to the mounting lug 34 of the main frame 12. The shock mount 54 preferably comprises an identically configured pair of shock mount segments 56 which extend in spaced, generally parallel relation to each other over opposite sides of the tire 52 and seat tube 18.

The rear assembly 36 further comprises a shock absorber 58 having an elongate, generally cylindrical body 60 which is pivotally connected to the shock mount 54. More particularly, the body 60 is extended through the space defined between the shock mount segments 56, and is pivotally connected to the shock mount segments 56 in relative close proximity to the seat tube 18 of the main frame 12. Extending axially from the body 60 downwardly toward the mounting bracket 26 is an elongate piston rod 62 of the shock absorber 58. Attached to the distal end of the piston rod 62 and extending axially therefrom is a coupling member 64 which includes an enlarged, circularly configured distal end having an aperture 66 extending axially therethrough. The piston rod 62 is pivotally connected to the ear portion 30 of the mounting bracket 26 via the insertion of the coupling member 64 into the gap defined between the ear segments 32 such that the aperture 66 is coaxially aligned with a pair of apertures disposed within respective ones of the ear segments 32. Thereafter, a fastener such as a pivot pin is advanced through the coaxially aligned apertures, thus facilitating the pivotal connection of the piston rod 62 to the mounting bracket 26. In the rear assembly 36, the shock absorber 58 comprises a "pull shock" for reasons which will be discussed in more detail below.

Having thus described the structural attributes of the bicycle 10 constructed in accordance with the present invention, the functionality thereof will now be described. In the bicycle 10, when the rear wheel 45 encounters a bump or other obstruction, the rear assembly 36 is pivoted upwardly relative to the main frame 12. This movement of the rear assembly 36 results in the upward pivotal movement of the chain stays 38 about the pivot axis defined by the front pair of flexible joints 40 extending between the front ends of the chain stays 38 and the adaptor portion 28 of the mounting bracket 26. The upward pivotal movement of the rear assembly 36 also results in the upward pivotal movement of the shock mount 54 about the pivot point defined between the front end thereof and the mounting lug 34 attached to the seat tube 18 of the main frame 12.

Due to the pivotal mounting of the body 60 of the shock absorber 58 to the shock mount 54, the upward pivotal movement of the shock mount 54 causes the body 60 to be pulled upwardly relative to the piston rod 62 which, as previously indicated, is pivotally connected to the ear portion 30 of the mounting bracket 26 via the coupling member 64. Due to the shock absorber 58 comprising a pull shock rather than a compression shock, the upward movement of the body 60 of the shock absorber 58 relative to the piston rod 62 thereof effectively dampens the shock force applied to the rear wheel 45 of the bicycle 10. After the rear wheel 45 has cleared the bump or other obstruction, the shock absorber 58 and front and back pairs of flexible joints 40, 46 facilitate the rebound of the rear assembly 36 to its original, unactuated state.

Due to the construction of the bicycle 10, and in particular the main frame 12 and rear assembly 36 thereof, the shock absorber 58 of the rear assembly 36 does not load the seat tube 18 or down tube 20 of the main frame 12, and is additionally removed from within the interior of the front triangle defined thereby. By lowering the position of the shock absorber 58 relative to the main frame 12, the center of gravity of the bicycle 10 is significantly lowered which substantially enhances the handling and performance characteristics thereof. Additionally, the construction of the bicycle 10, and in particular the extension of the shock absorber 58 behind the seat tube 18 of the main frame 12 (i.e., the removal of the shock absorber 58 from within the interior of the main frame 12) provides various efficiencies in the assembly of the bicycle 10, thereby reducing the associated manufacturing costs. Such efficiencies include a reduction in the complexity of the bicycle design attributable to the common shock absorber/chain stay mounting bracket 26 of the main frame 12.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. A bicycle comprising:
   a main frame comprising:
   an elongate seat tube:
   an elongate down tube:
   a bottom bracket shell attached to said seat tube and said down tube, and
   a mounting bracket attached to said bottom bracket shell:
   a shock absorbing rear assembly pivotally connected to said main frame and comprising:
   a pair of chain stays pivotally connected to said mounting bracket:
   a pair of drop-outs attached to respective ones of said chain stays;
   a pair of swingarms attached to respective ones of said drop-outs;
   a shock mount pivotally connected to and extending between said swingarms and said seat tube; and
   a shock absorber pivotally connected to and extending between said shock mount and said mounting bracket.

2. The bicycle of claim 1 wherein the mounting bracket comprises:
   an adaptor portion attached to said bottom bracket shell; and
   an ear portion attached to said adaptor portion;
   said chain stays being pivotally connected to said adaptor portion and said shock absorber being pivotally connected to said ear portion.

3. The bicycle of claim 1 wherein said main frame further comprises a mounting lug attached to said seat tube, said shock mount being pivotally connected to the mounting lug.

4. The bicycle of claim 1 wherein said seat tube has an arcuately contoured configuration.

5. The bicycle of claim 1 wherein the shock absorber is positioned rearwardly of the seat tube.

* * * * *